United States Patent [19]
Takabayashi

[11] 3,823,443
[45] July 16, 1974

[54] PLASTIC CLASP MEANS
[75] Inventor: Teruo Takabayashi, Kyoto, Japan
[73] Assignee: Kohshoh Limited, Kyoto, Japan
[22] Filed: Mar. 2, 1973
[21] Appl. No.: 337,691

[30] Foreign Application Priority Data
Oct. 11, 1972  Japan............................. 47-117448

[52] U.S. Cl.............................. 24/186, 24/255 SL
[51] Int. Cl...................... A44b 11/20, A44b 21/00
[58] Field of Search........ 24/213 R, 213 CS, 206 A, 24/208 A, 248 SL, 255 SL, 248 HC, 249 SL, 255 H, 255 BC, 73 P, 73 PF, 73 LF, 79, 107, 16 R, 245 FF, 259 A, 243 GE, 201 S, 230 SL, 137 A, 186, 198; 223/DIG. 1, DIG. 2; 85/5 R

[56] References Cited
UNITED STATES PATENTS

| | | | |
|---|---|---|---|
| 293,831 | 2/1884 | Wickers........................... | 24/206 A |
| 440,655 | 11/1890 | Sawyer...................... | 24/248 SL UX |
| 460,066 | 9/1891 | Bell................................. | 24/186 X |
| 936,565 | 10/1909 | Rosenberg.................... | 24/186 UX |
| 1,628,962 | 5/1927 | Fletcher.......................... | 24/73 LF |
| 2,818,871 | 1/1958 | Beaudry..................... | 24/255 H UX |
| 3,317,968 | 5/1967 | Plastock.................. | 24/255 SL UX |
| 3,415,155 | 12/1968 | Riddell et al..................... | 24/73 PF |
| 3,526,935 | 9/1970 | Boyce et al. .................... | 24/255 SL |

FOREIGN PATENTS OR APPLICATIONS

| | | | |
|---|---|---|---|
| 1,158,170 | 1/1958 | France............................. | 24/208 A |
| 28,851 | 8/1964 | Germany......................... | 24/255 SL |
| 1,166,558 | 3/1964 | Germany......................... | 24/245 FF |
| 148,654 | 8/1920 | Great Britain................... | 24/213 CS |
| 95,830 | 8/1922 | Switzerland...................... | 24/137 A |

Primary Examiner—Donald A. Griffin

[57] ABSTRACT

The present invention relates to a plastic clasp means comprising a first plate member, a second plate member, a bendable hinge member interconnecting said plate members and governing the opening and closing thereof, and a fitting means consisting of at least a couple of male and female fitting elements, said male fitting element being provided on a required position of said first plate member and said female fitting element being provided in said second plate member at a position corresponding to said position of the male fitting element, whereby when said first and second plate members are in the state of "closed," said male fitting element is fitted in said female fitting element.

3 Claims, 14 Drawing Figures

PLASTIC CLASP MEANS

The present invention relates to a clasp means applicable as a buckle, adjuster, fastener or connector of belts or bands to be worn on trousers, skirts and others, of suspender straps, or of shoe and hat ribbons.

Since most of the conventionally used buckles are made of metals, they are likely to damage the materials of the belts or bands, or of the garments when the same are caught by the buckles. Also, the conventional type metal buckles provide uneasiness to the wearers due to their peculiar heaviness, rigidness and coolness.

Further, the conventional adjuster for adjusting the length of the suspender straps or the like is operated in such a way that a lever thereof having a nail at its top end is pivotted about a fulcrum, i.e., a bearing provided at the side portion of covering plate of the adjuster, to adjust the length of straps. The adjuster of such construction is, however, inconvenient due to the above-mentioned pivotal operation at the time of adjusting the length of straps. Moreover, as most of the adjusters are also made of metals, like the aforesaid buckles, they possess those disadvantages inherent to metal.

Furthermore, no article is ever known which, as a single unit, is capable of functionating as both buckle and ajuster.

The main object of the present invention is to obviate the above-mentioned disadvantages and to provide a clasp means having an improved design and construction.

Another important object of the present invention is to provide a clasp means which is integrally formed of a plastic material, and which can be manufactured simply, readily and inexpensively. A further object of the present invention is to provide an extremely convenient clasp means which, as a single unit, can be used as a buckle, adjuster, fastener and connector.

In order to achieve these objects, the present invention provides a plastic clasp means comprising a first plate member, a second plate member, a bendable hinge member interconnecting said plate members and governing the opening and closing thereof, and a fitting means consisting of at least a couple of male and female fitting elements, said male fitting element being provided on a required position of said first plate member and said female fitting element being provided in said second plate member at a position corresponding to said position of the male fitting element, so that, when said first and second plate members are in the state of "closed," said male fitting element is fitted in said female fitting element.

The material to be used for making the clasp means according to the present invention is preferably selected from soft synthetic resins such as polypropylene, polyvinyl chloride or the like.

The clasp means according to the present invention is extremely simple and easy to operate, and the reliability thereof for holding the objects such as the bands, belts, straps or the like is so excellent that the portion of these objects held by said clasp means will hardly slip off therefrom.

Further, the clasp means according to the present invention which is wholly formed of the plastic materials is greatly superior to the conventional metal buckles, adjusters and connectors in respect of its resilience and feeling. Further, its mechanical strength and smoothness degree of its surfaces are relatively good, and it is considerably light as compared to the conventional metal buckles, adjusters, connectors or the like.

Furthermore, the clasp means according to the present invention can be manufactured on mass-production basis by injection molding or the like, whereby its manufacturing cost can be substantially reduced resulting in inexpensive products.

Moreover, the clasp means according to the present invention is capable of functionating much more superiorly than the conventional buckles, adjusters or the like, and the band, belt or straps carrying said clasp means are much more comfortable to wear than the band, belt or straps carrying the conventional type buckles, etc.

Other features and advantages of the present invention will be apparent from the following detailed description of the embodiments accompanied by the attached drawings in which.

Figure 1:
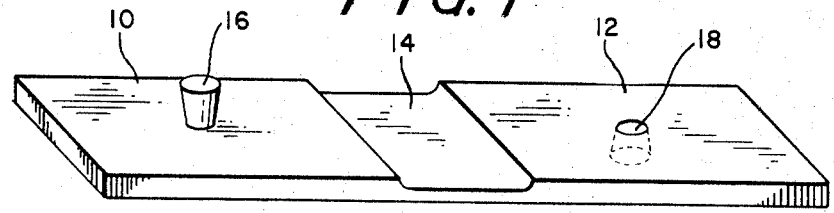
FIG. 1 is a perspective view of a clasp means according to the present invention.

Referring now to the drawings, FIG. 1 shows the basic embodiment of the clasp means according to the present invention, wherein numerals 10 and 12 represent a first plate member and a second plate member, respectively, said plate members being integrally interconnected by means of a hinge member 14. These members are molded integrally of polyvinyl chloride or other preferable synthetic resinous materials.

The hinge member 14 is, as shown in FIG. 1, formed thinner than both plate members 10 and 12 in order to facilitate the pivotal movement of each of the plate members or the bending action thereof and to improve the bending strength of said hinge member 14.

Numeral 16 represents a male fitting element formed integrally with the first plate member on the inner face thereof, and numeral 18 represents a female fitting element which is adapted to receive the male fitting element when both plate members are in the state of "closed." These male and female fitting elements constitute a couple of fitting means.

In FIG. 1 the male fitting element 16 is illustrated as a projection of reversed frusto-conical shape, while the female fitting element 18 of the complementary configuration is illustrated as a penetrating hole formed through the thickness of the second plate member.

In the clasp means as shown in FIG. 1, the male fitting element or projection 16 is preferably formed to provide tight fit as against the female fitting element or penetrating hole 18, so that when the clasp means is folded (the "closed" state of the plate members 10 and 12), the male fitting element 16 is engaged in the female fitting element 18 to produce a reliable locking effect. Accordingly, said couple of male and female fitting elements 16 and 18 can be made in any desirable shape that can produce the above-mentioned locking effect (some of the modifications thereof will be described later).

Figure 2:
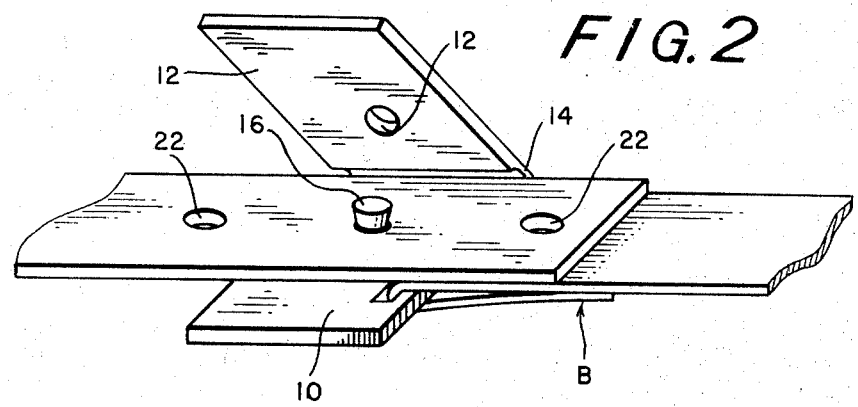
FIG. 2 is a partly broken perspective view of the clasp means according to the present invention showing the case when said clasp means is used as a buckle or an adjuster for a band or a belt.

FIG. 2 shows how the clasp means similar to the one in FIG. 1 is used as a buckle or an adjuster of a band or a belt. There is a slot 20 formed in the first plate member 10 of this clasp means, and by means of said slot 20 one end of the band or belt B is securely fixed to said plate member 10. At the other end of the band or belt B there are provided beforehand a plurality of adjusting holes 22, each of them being spaced apart with a certain distance, and the male fitting element 16 of the first plate member 10 is adapted to fit selectively in one of these adjusting holes 22.

Figure 3:
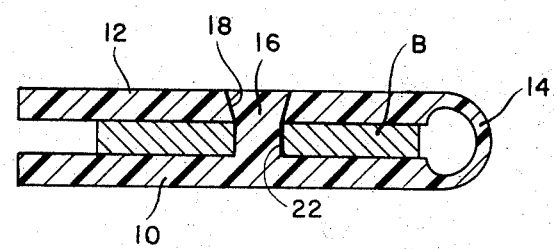
FIG. 3 is a sectional view of the clasp means shown in FIG. 2, in this case both plate members being in the state of "closed"

In FIG. 3 there is shown a sectional view of the above-mentioned clasp means or the buckle or adjuster which has completed its operation.

Figure 4:
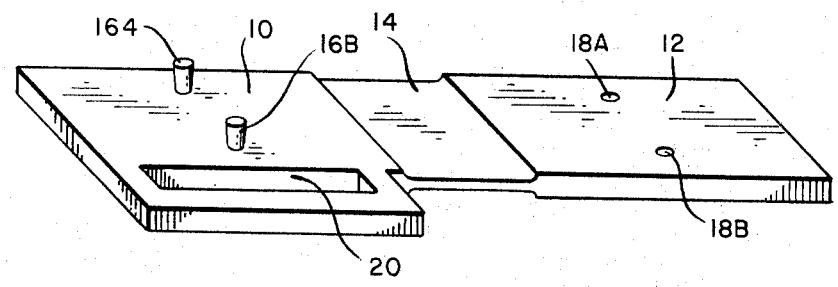
FIG. 4 and FIG. 8 are the perspective views of modifications of male and female fitting elements of the clasp means according to the present invention.

In the clasp means shown in FIGS. 1 to 3, there is provided only a couple of fitting means consisting of the male fitting element 16 and the corresponding female fitting element 18, however, more than a couple of fitting means can also be provided. FIG. 4 shows a clasp means formed with two couples of fitting means one of which consists of male and female fitting elements 16A and 18A and the other of male and female fitting elements 16B and 18B.

Figure 5:
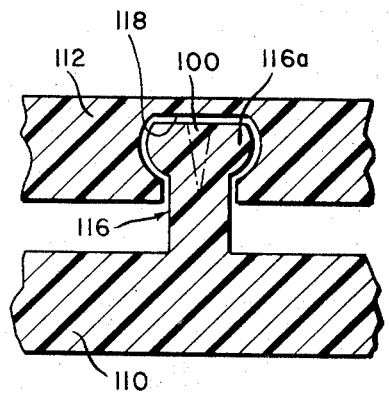
FIG. 5 and FIG. 6 are the partially sectional views of the same modifications of the male and female fitting elements of the clasp means according to the present invention.
Figure 6:
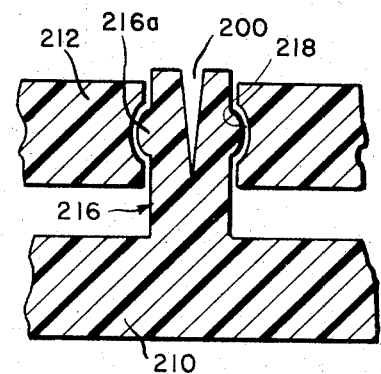
Figure 9:
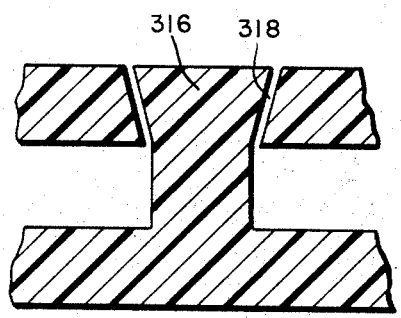
FIG. 9 is a partially sectional view of the clasp means of FIG. 8 showing the state of interlocked plate members.
Figure 7:
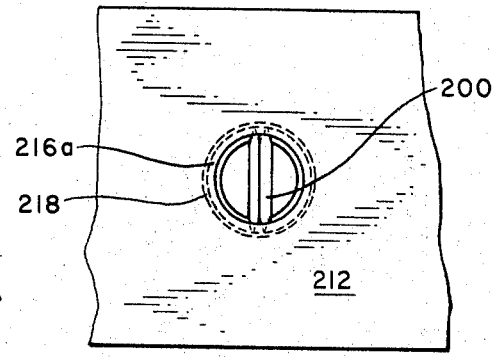
FIG. 7 is a partial plan view of the clasp means of FIG. 6.
Figure 8:
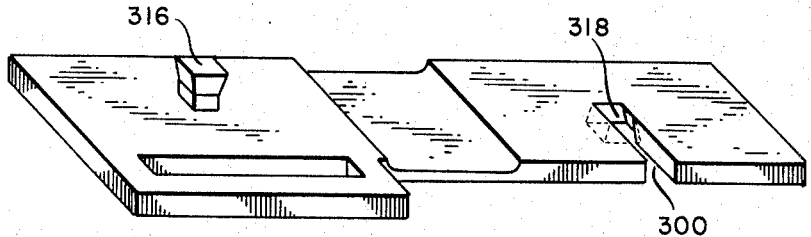
Figure 14:
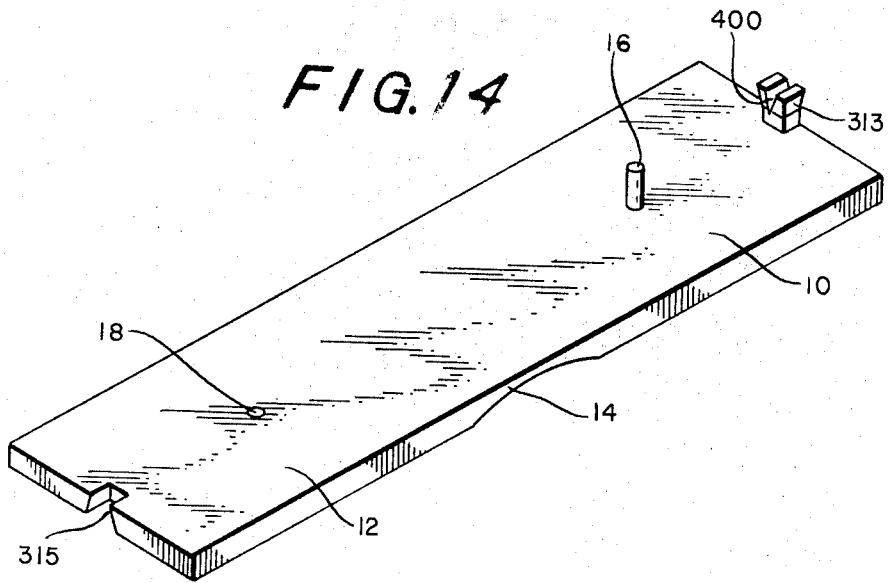
FIG. 14 is a perspective view of another embodiment of the clasp means according to the present invention wherein the male fitting element is provided with a notch.

FIGS. 5 to 7 show modifications of the male fitting element and corresponding female fitting element. In FIG. 5 a male fitting element 116 is illustrated as a mushroom shaped projection formed integrally on the inner face of a first plate member 110, while a female fitting element 118 is illustrated as a recess formed correspondingly with the head portion of the mushroom shaped projection 116 on the inner side portion of a second plate member 112. Further, a male fitting element 216 shown in FIGS. 6 and 7 is illustrated as a cylindrical projection having an expanded portion 216a at the central side portion thereof and being formed integrally on the inner face of a first plate member 210, while a female fitting element 218 is illustrated as a penetrating hole formed perpendicularly through a second plate member 212, said male fitting element 216 being provided with a notched portion 200 for facilitating its insertion into and removal from the penetrating hole 218. Likewise, in the above-mentioned modification shown in FIG. 5, a notched portion (shown in FIG. 5 by an imaginary line 100) can also be formed in the mushroom shaped projection 116. Such notched portion provided for facilitating loading and unloading can also be formed in the male fitting element of the fitting means. For example, a clasp means shown in FIG. 14 comprises a male locking element or wedge like projection 313 and a corresponding female fitting element or slot 315, and a notched portion 400 is formed in the projection 313 in order to facilitate loading and unloading of the latter.

The male fitting element and the female fitting element according to the present invention can also be made in a reversed truncated pyramid shaped projection 316 and a corresponding slot 318, respectively. In this case an opening 300 can be formed in order to facilitate insertion of the projection 316 into the slot 318 and removal of the same therefrom.

Figure 10:
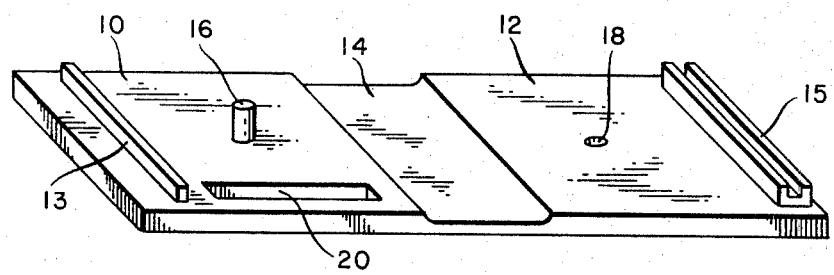
FIG. 10 is a perspective view of the clasp means according to the present invention wherein auxiliary locking elements are provided.

As shown in the embodiment of FIG. 10, in addition to the fitting means consisting of the male fitting element and the female fitting element, there can also be provided a couple of locking means comprising a male locking element and a female locking element to further assure the engagement of the first plate member and the second plate member. Said male locking element is, for example, a ridge 13 formed at the outer end portion of one plate member 10, and said female locking element is, for example, a channel 15 formed at the outer end portion of the other plate member 12, said channel 15 being adapted to receive said ridge 13 therein and lock it tightly therewith. In case of this embodiment, the male fitting element may be a single rather small cylindrical projection 16 as shown in FIG. 10 enough to pass through loosely the adjusting holes of the band, belt or the like, and the female fitting element may be a corresponding cylindrical bore 18. Further in this case, the male fitting element or projection 16 and the female fitting element or bore 18 need not necessarily be of the tight fit relation as previously described with reference to the embodiment of FIG. 1 but can be of a loose fit relation. The male and female locking elements may have any shape or construction as long as they can produce the interlocking engagement of both plate members.

Figure 11:
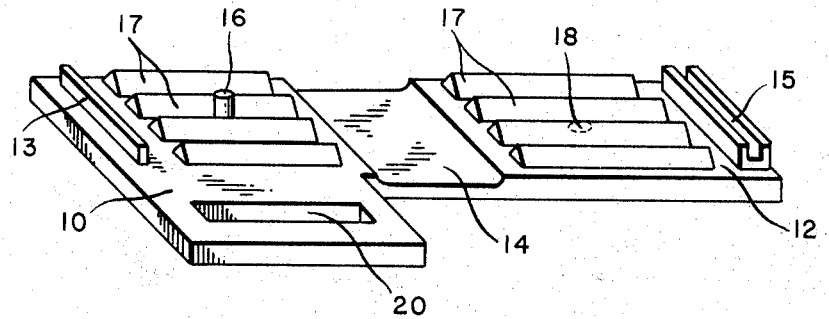
FIG. 11 and FIG. 12 are the perspective views of the clasp means according to the present invention wherein additional auxiliary locking elements and antiskid elements are provided.

In use of the clasp means according to the present invention, the bands, belts, straps or the like to be held by said clasp means will never come off therefrom as these objects are not only pressed between the first and second plate members but are anchored securely by the fitting means. However, an antiskid means can be formed on at least one of the plate members in order to assure a reliable anchoring of such bands, belts, straps or the like by the clasp means and to prevent slipping. In FIG. 11 the antiskid means are provided on the inner face of both plate members comprising a number of ridges 17 disposed lengthwise on each of the plate members and having a sectional triangular form. However, said antiskid means may be of any construction as long as they prove successful as an antiskid means.

Figure 12:
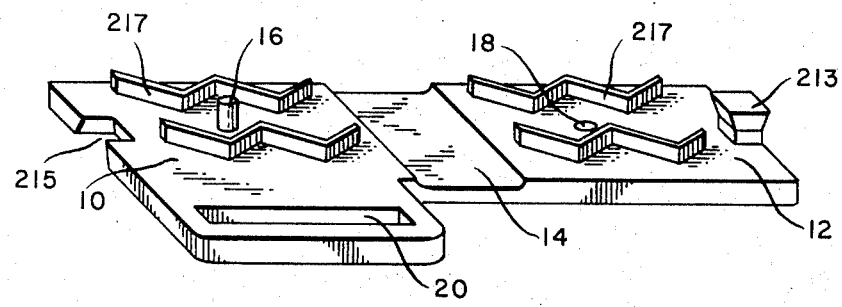

In FIG. 12 there are shown the modifications of the locking means and of the antiskid means, the male locking element being illustrated as a reversed truncated pyramid shaped projection 213 formed on the second plate member 12, the female locking element being illustrated as a notched portion 215 formed in the first plate member 10, and the antiskid means comprising a plurality of zig-zag ridges 217. In both FIG. 11 and FIG. 12, the antiskid means are seen to extend generally transversely to the hinge portion.

Figure 13:
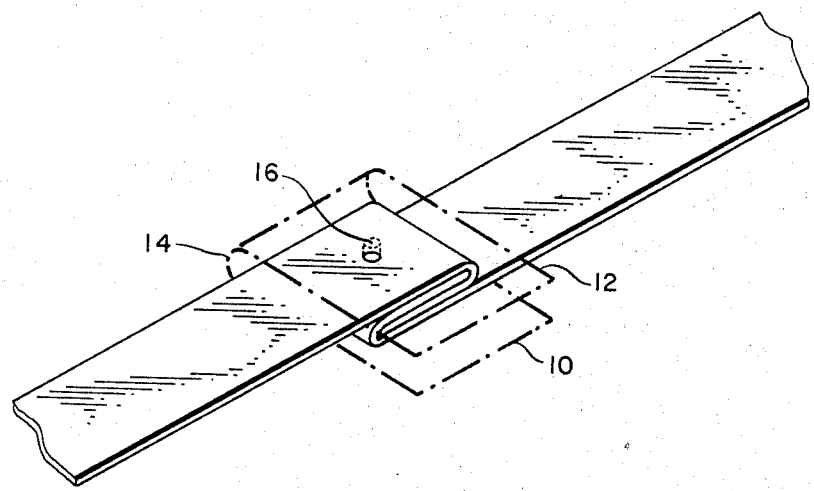
FIG. 13 is a diagrammatic perspective view of an embodiment wherein the clasp means is used as a fastener or a connector at the strap portion to be fixed or connected, the clasp means being shown in an imaginary line.

When the clasp means of the present invention is to be used, for example, as a fastener or connector as shown in FIG. 13, there is no need of providing the slot 20, thus the clasp means as illustrated in FIG. 1 may be applicable for such use.

Since the clasp means of the present invention is molded integrally of the plastic materials as described before, it can be manufactured on a mass production basis and can be made in smaller size and lighter weight than the conventional type metal buckles, adjusters, fasteners, connectors or the like.

What I claim is:

1. In combination, a clasp formed from integrally molded plastic and a band, the band having an opening therethrough, the clasp comprising:
   a. a first plate portion,
   b. a second plate portion,
   c. a bendable hinge portion interconnecting the plate portions and permitting the first and second plate portions to be brought into overlying relationship, the band extending between the overlying plate portions,
   d. fitting means comprising at least one male and one female fitting element, the male fitting element being formed on the first plate portion and passing through the hole in the band and into the female fitting element formed on the second plate member, one of the plates being provided with a slot for fastening one end of the band to the clasp through the slot, and
   e. antiskid means provided on the inner surface of at least one of the plate portions of the clasp.

2. The structure of claim 1 including locking means on the clasp, the locking means comprising at least one male and one female locking element, the male locking element being formed on the outer end portion of one of the plate portions, and the female locking element being formed on the other plate portion at a position corresponding to that of the male locking element and being adapted to be locked in the male element.

3. The structure of claim 1 in which the antiskid means comprises a plurality of ridges on each of the plate portions which extend generally transversely to the hinge portion.

* * * * *